United States Patent
Bennett et al.

(10) Patent No.: US 11,468,385 B2
(45) Date of Patent: Oct. 11, 2022

(54) SYSTEMS AND METHODS FOR EVALUATING DATA SECURITY OF A TARGET SYSTEM

(71) Applicant: MASTERCARD INTERNATIONAL INCORPORATED, Purchase, NY (US)

(72) Inventors: Christopher David Bennett, Fort Worth, TX (US); Anastasia Nitis, West Harrison, NY (US); Erich Snyder, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 114 days.

(21) Appl. No.: 16/672,039

(22) Filed: Nov. 1, 2019

(65) Prior Publication Data
US 2021/0133648 A1 May 6, 2021

(51) Int. Cl.
*G06Q 10/06* (2012.01)
*G06F 16/2455* (2019.01)
*G06Q 30/00* (2012.01)
*G06F 21/57* (2013.01)

(52) U.S. Cl.
CPC ... *G06Q 10/0635* (2013.01); *G06F 16/24564* (2019.01); *G06F 21/577* (2013.01); *G06Q 30/0185* (2013.01); *G06F 2221/034* (2013.01)

(58) Field of Classification Search
CPC ................................................ G06Q 10/0635
See application file for complete search history.

(56) References Cited

U.S. PATENT DOCUMENTS

| 10,142,204 | B2 | 11/2018 | Nickolov et al. |
| 10,154,047 | B2 | 12/2018 | Muddu et al. |
| 10,360,408 | B1 | 7/2019 | Kincaid et al. |
| 10,452,851 | B2 | 10/2019 | Croce |
| 2010/0257134 | A1 | 10/2010 | Vasireddy et al. |

(Continued)

OTHER PUBLICATIONS

Vikas Hassija et al. A Survey on IoT Security: Application Areas, Security Threats, and Solution Architectures, IEEE Access vol. 7, 2019, pp. 82721-82743 (Year: 2019).*

(Continued)

*Primary Examiner* — Andre D Boyce
(74) *Attorney, Agent, or Firm* — Armstrong Teasdale LLP

(57) ABSTRACT

A data security evaluation computing device for evaluating data security of a target system is coupled to a plurality of data sources including the target system, and receives a request message requesting data security review, the request message including an identifier of the target system. The computing device queries a first data source to receive data representing whether the target system has previously breached, and locally caches the data. The computing device queries a second data source to receive data associated with a potential for a future data breach, and locally caches the data. The computing device also generates a data security score by analyzing the locally cached data, the data security score representing a likelihood the target system was or will be the subject of a data breach, compiles the data security score and additional data into a data security report, and transmits a response message including the report.

19 Claims, 8 Drawing Sheets

(56) References Cited

U.S. PATENT DOCUMENTS

| | | | |
|---|---|---|---|
| 2012/0096145 A1 | 4/2012 | Le et al. | |
| 2015/0073981 A1* | 3/2015 | Adjaoute | G06Q 30/0225 |
| | | | 705/39 |
| 2017/0026401 A1 | 1/2017 | Polyakov | |
| 2017/0155675 A1* | 6/2017 | Howe | H04L 63/1425 |
| 2017/0264619 A1* | 9/2017 | Narayanaswamy | H04L 63/105 |
| 2019/0124107 A1 | 4/2019 | Huang et al. | |
| 2019/0207953 A1 | 7/2019 | Klawe et al. | |
| 2019/0207954 A1 | 7/2019 | Ahuja et al. | |
| 2019/0362069 A1* | 11/2019 | Park | G06F 16/904 |
| 2020/0036743 A1* | 1/2020 | Almukaynizi | G06N 5/048 |
| 2020/0193022 A1* | 6/2020 | Lunsford | G06F 21/568 |
| 2020/0358621 A1* | 11/2020 | Ngo | H04L 9/0643 |
| 2021/0029156 A1* | 1/2021 | Sharifi Mehr | H04L 63/1433 |
| 2021/0125089 A1* | 4/2021 | Nickl | G06N 20/00 |

OTHER PUBLICATIONS

J. Pikoulas etal, An Intelligent Agent Security Intrusion System, Proceedings Ninth Annual IEEE International Conference and Workshop on the Engineering of Computer-Based Systems (Year: 2002).*
Schultz et al, Data Mining Methods for Detection of New Malicious Executables, Proceedings 2001 IEEE Symposium on Security and Privacy. S&P 2001, pp. 38-49 (Year: 2001).*

* cited by examiner

SYSTEMS AND METHODS FOR EVALUATING DATA SECURITY OF A TARGET SYSTEM

BACKGROUND

This disclosure relates generally to electronic systems facilitating evaluating data security and, more particularly, to computer systems and computer-based methods for evaluating the data security of a computing system associated with a target of a merger or acquisition.

Mergers and acquisitions are commonplace in business today. It is also commonplace for the merging parties or the acquiring parties to perform some level of due diligence on their target interests before acquiring or merging with said target interests. These target interest business are referred to herein as "targets" or "target systems." The due diligence involves determining, in part, what the actual value of the target is, as well as the risks posed by incorporating the target into the acquiring business. The acquiring party may therefore research the target's debt obligations as well as their data security practices. For example, acquiring an entity that has been the subject of a data breach may put the acquiring interest's goodwill at risk, and the data breach may be expensive to rectify. Current methods of due diligence rely heavily on self-reporting from the target about their security practices and reviews from external third parties. These known reviews often rely on publicly available data such as public reports of data breaches, bankruptcy filings, and the like. Accordingly, these reviews can fail to identify undisclosed or undiscovered data breaches associated with the target.

Therefore, a system configured to identify evaluate the data security position of a target is needed.

BRIEF DESCRIPTION

In one aspect, a data security evaluation computing device for evaluating data security of a target system is provided. The data security evaluation computing device is communicatively coupled to a plurality of data sources including the target system, and includes a processor in communication with a memory device. The processor is programmed to receive, from an acquiring party computing device, a security review request message requesting a data security review for the target system, the security review request message including an identifier of the target system. The processor is also programmed to query, using the identifier of the target system, a first data source of the plurality of data sources, to receive data representing whether the target system has been a subject of a past data breach, locally cache, in the memory device, the data representing whether the target system has been a subject of a past data breach, and query, using the identifier of the target system, a second data source of the plurality of data sources, to receive data associated with a potential for a future data breach at the target system. The processor is further programmed to locally cache, in the memory device, the data associated with the potential for a future data breach at the target system, generate a data security score by analyzing the locally cached data, the data security score representing a likelihood that the target system has been the subject of a data breach and is vulnerable to a future data breach, and compile the data security score and one or more additional data elements into a data security report, the one or more additional data elements including a recommendation to reduce vulnerability to a future data breach at the target system. The processor is also programmed to transmit, to the acquiring party computing device, a security review response message including the data security report.

In another aspect, a computer-implemented method for evaluating data security of a target system is provided. The method is implemented using a data security evaluation computing device communicatively coupled to a plurality of data sources including the target system, the data security evaluation computing device including a processor in communication with a memory device. The method includes receiving, from an acquiring party computing device, a security review request message requesting a data security review for a target system, the security review request message including an identifier of the target system, querying, using the identifier of the target system, a first data source of the plurality of data sources, to receive data representing whether the target system has been a subject of a past data breach, and locally caching, in the memory device, the data representing whether the target system has been a subject of a past data breach. The method also includes querying, using the identifier of the target system, a second data source of the plurality of data sources, to receive data associated with a potential for a future data breach at the target system, locally caching, in the memory device, the data associated with the potential for a future data breach at the target system, and generating a data security score by analyzing the locally cached data, the data security score representing a likelihood that the target system has been the subject of a data breach and is vulnerable to a future data breach. The method further includes compiling the data security score and one or more additional data elements into a data security report, the one or more additional data elements including a recommendation to reduce vulnerability to a future data breach at the target system, and transmitting, to the acquiring party computing device, a security review response message including the data security report.

In yet another aspect, at least one non-transitory computer-readable storage medium having computer-executable instructions embodied thereon is provided. When executed by at least one processor of a data security evaluation computing device communicatively coupled to a plurality of data sources including a target system, the computer-executable instructions cause the at least one processor to receive, from an acquiring party computing device, a security review request message requesting a data security review for the target system, the security review request message including an identifier of the target system, and query, using the identifier of the target system, a first data source of the plurality of data sources, to receive data representing whether the target system has been a subject of a past data breach. The computer-executable instructions also cause the at least one processor to locally cache, in a memory device, the data representing whether the target system has been a subject of a past data breach, query, using the identifier of the target system, a second data source of the plurality of data sources, to receive data associated with a potential for a future data breach at the target system, and locally cache, in the memory device, the data associated with the potential for a future data breach at the target system. The computer-executable instructions further cause the at least one processor to generate a data security score by analyzing the locally cached data, the data security score representing a likelihood that the target system has been the subject of a data breach and is vulnerable to a future data breach, compile the data security score and one or more additional data elements into a data security report, the one or more additional data elements including a recommendation to reduce vulnerability to a future data breach at the target system, and transmit, to the acquiring party computing device, a security review response message including the data security report.

BRIEF DESCRIPTION OF THE DRAWINGS

FIG. 1 is a simplified block diagram of an example computing system for evaluating data security of a target system, in accordance with one example embodiment of the present disclosure.

FIG. 2 illustrates a simplified data flow between a data security evaluation computing device of the computing system shown in FIG. 1 and a first data source.

FIG. 3 illustrates a simplified data flow between the data security evaluation computing device and a second data source.

FIG. 4 illustrates a simplified data flow between the data security evaluation computing device and a third data source.

FIG. 5 illustrates a simplified data flow between the data security evaluation computing device and a fourth data source.

FIG. 6 is a schematic diagram of the data security evaluation computing device generating a data security score for a target system.

FIG. 7 depicts an example computing device that may be used to implement the data security evaluation computing device.

FIG. 8 is a flow diagram of a computer-implemented method for evaluating data security of a target system.

DETAILED DESCRIPTION

Figure 1:
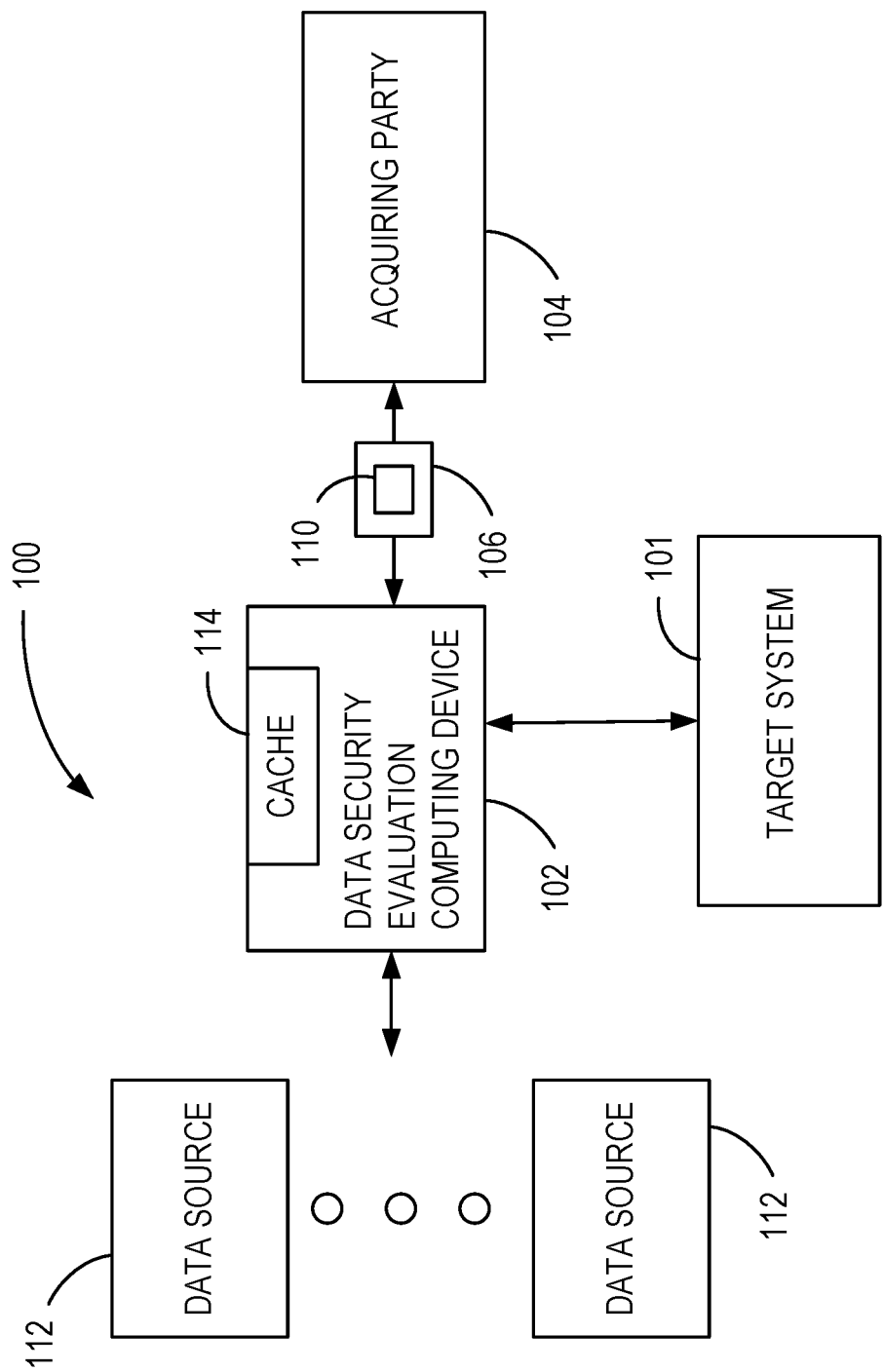
FIGS. 1-8 show example embodiments of the methods and systems described herein.

The following detailed description illustrates embodiments of the disclosure by way of example and not by way of limitation. The description enables one skilled in the art to make and use the disclosure. It also describes several embodiment, adaptations, variations, alternatives, and uses of the disclosure, including what is presently believed to be the best mode of carrying out the disclosure.

There is a need for a centralized computing system configured to access and analyze available data from a plurality of data sources to evaluate the data security of a computing system with respect to data breaches (also known as "data breach security") or other data-related vulnerabilities of a business that is being considered for a merger or acquisition, that is, a "target" or "target system".

Embodiments of the present disclosure describe a data security evaluation computer device and method implemented using a computing system that is in communication with a plurality of data sources. The data security evaluation computing device is configured to leverage data from the plurality of data sources to evaluate the data security of a target system, and to generate a data security score associated with a merchant or business entity. In the example embodiment, the merchant or business entity is the subject or "target" of a merger or an acquisition, and is therefore referred to generally as a "target" or a "target system." The data security evaluation computing device receives a request from a third party (e.g., an "acquiring party") identifying the target system, and requesting the data security evaluation computing device provide a data security score for the target system. The data security evaluation computing device retrieves data from the plurality of data sources and queries or tests the target system so as to generate the requested data security score.

One or more of the data sources stores or facilitates access to data representing whether the target system has been a subject of a past data breach, and one or more other data sources stores or facilitates access to data associated with a potential for a future data breach at the target system. The data sources may store data such as prior and present fraud data, vulnerability assessments, illicit threat assessments, and compliance assessments, as described further herein. In some cases in which the data security evaluation computing device queries the target system directly, the target system may also be considered a data source. The data security evaluation computing device aggregates and analyzes the retrieved data to generate an overall data security score and identify any particular vulnerabilities or areas of concern. The data security evaluation computing device may also generate one or more recommendations and/or detailed assessments based on the identified vulnerabilities.

In the example embodiment, the data security evaluation computing device is associated with or integral to a payment processing network or payment card interchange network configured to process payment card transactions (e.g., MASTERCARD networks, VISA networks, etc.). One or more of the data sources stores transaction data associated with payment card transactions, or transaction-related data. For example, transaction-related data includes return or chargeback data, transaction decline data (e.g., data regarding transactions declined for suspect fraud), fraud reports identifying suspected fraudulent completed transactions, and the like. Transaction data and transaction-related data are useful to data security evaluations, particular for merchant target systems. Specifically, as described further herein, investigations into whether payment cards that have transacted at the merchant target system are later associated with fraud indicates either a data breach or some level of vulnerability to a data breach at the target system. Moreover, transaction data and transaction-related data are stored in encrypted, anonymized, and/or otherwise secured formats, and such data is confidential or unavailable to parties outside of the payment processing network. In the example embodiment, the data security evaluation computing device includes suitable decryption functionality that enables the data security evaluation computing device to safely access and process the data from encrypted data sources.

The data security evaluation computing device, as a part of the payment processing network or as associated therewith, is in data communication with the data sources storing transaction and transaction-related data. Moreover, the data security evaluation computing device is in data communication with the target system (e.g., a merchant target system), such that the data security evaluation computing device may request, query, test, or otherwise access data directly from the target system. Accordingly, the data security evaluation computing device may aggregate, analyze, and synthesize data from the data sources as well as the target system. As such, the data security evaluation computing device is able to generate a data security score and/or an associated data security assessment that incorporates past, present, and future security vulnerabilities to present a comprehensive perspective of the data security position of the target system. This analysis can be performed and reviewed before an acquiring party actually acquires the target.

In some embodiments, a first data source may include a fraud report data source, which stores inactive fraud reports (e.g., reported fraud for which an investigation has been completed and remedial action has been taken) and active fraud reports (e.g., reported fraud still undergoing investigation and/or remediation). These fraud reports may relate to payment card transactions initiated by someone other than a legitimate cardholder of the payment card used to initiate the transaction, or payment card transactions initiated by the legitimate cardholder but reported as a fraudulent transaction. In some cases, fraud events or incidents are reported by accountholders or payment cardholders that have transacted with one or more merchants and have subsequently encountered fraudulent activity associated with their payment account/payment card. The fraudulent activity may include, for example, their payment account being using to initiate unauthorized transactions. Such fraudulent transactions may be a sign of a data breach because oftentimes cardholder data may be the subject of a data breach such that data thieves are able to use or sell the cardholder data for use by fraudsters.

When fraud incidents are reported, an investigation is conducted to identify a source of the fraud, including, for example, the unauthorized user of the payment account and/or where or how the unauthorized user captured the details of the payment account. The investigations often include collecting data about which merchants were transacted with, for each payment account reporting fraud. In some cases, the investigation determines that a single location (e.g., one merchant or a particular location of that merchant) is a "common point of purchase" (CPP) between a plurality of payment accounts associated with respective fraud reports. In such cases, the merchant or merchant location is identified as a potential or likely CPP, or the source of a data breach exposing the cardholder data. When a CPP data breach is identified, a record indicating the merchant source of data breach is generated and stored in a fraud report database. That is, the fraud report database includes a table or other data structure that associates identified data breaches with breached merchants. The fraud report database may also include any data generated between the initial fraud reports and the completion of a fraud investigation, including the lists of merchants at which fraudulent purchases were made and/or merchants that were transacted with prior to the reported fraud, as well as merchants investigated for breach and determined not to be a CPP data breach source.

In some cases, the fraud report database also includes reported transactions that were declined due to suspected fraud. For example, a transaction may be declined during processing based on the outcome of various fraud models or authentication procedures. The declined transactions may represent proxy fraud reports—that is, a particular cardholder may not have yet realized a payment account is being used fraudulently, but the fraud models may have preemptively detected the fraudulent use. Accordingly, receiving such fraud decline records is also useful in evaluating the data security position of a merchant target system, as such fraud declines may reveal a data breach that has not yet been identified using other review methods. Such declined transactions may also be incorporated into CPP data breach investigations, or may be unrelated to a particular CPP data breach (e.g., may represent an individual fraud event).

The data security evaluation computing device is configured to query the fraud report database using the identifier of the target system (e.g., a merchant identifier). The fraud report database returns any inactive and/or active fraud reports associated with that identifier. In some embodiments, the fraud report database returns individual fraud reports or an aggregation thereof, such as a total number of fraud reports. In some embodiments, the fraud report database returns, as part of the fraud reports or in separate data file(s), the results of any investigation into reported fraud, such as CPP data breach reports that identify the target system as the source of a CPP data breach. Moreover, in some embodiments, the fraud report database returns, as part of the fraud reports or in separate data file(s), a list of payment account identifiers (e.g., payment account numbers or PANs) associated with the fraud reports, referred to as a list of "affected PANs". Additionally or alternatively, the data security evaluation computing device is configured to parse all returned fraud reports for the PANs and locally generate the list of affected PANs.

Moreover, in some embodiments, the query to the fraud report database automatically initiates an additional review process of the fraud reports associated with the target system. The additional review process may be an automated process (e.g., conducted by the data security evaluation computing device or another computing device associated with the fraud report database) or may be a manual review. That is, in some embodiments, the query to the fraud report database automatically generates a review request or a follow-up request, such as a database query or a request in a queue for a human analyst to conduct a follow-up review.

The additional review process includes a CPP breach review. Specifically, a merchant target may be not be the subject of a (previous) CPP breach review unless or until a threshold number of payment accounts reporting fraud are shown to have transacted at that merchant. However, that merchant target may still represent a candidate for a CPP data breach that has yet to be identified because that threshold number has not been exceeded. The additional review process, initiated in response to or based on the query including the identifier of the target system, supersedes the threshold and reviews all (or a portion of) the fraud reports associated with the merchant target system. Accordingly, the data security evaluation computing device (or another computing device associated with the fraud reports database) processes all fraud reports with updated thresholds and/or algorithms associated with the merchant target to determine whether the merchant target is a likely or potential source of a CPP data breach. Additionally or alternatively, the data security evaluation computing device may generate a list of PANs that have transacted with the merchant target system for a period of time antedating the review process and compare that list of PANs to (i) the list of affected PANs, and/or (ii) a list of fraud declines, to identify additional, previously undetected fraud. In at least some cases, such a review may reveal the presence of a data breach or a potential data breach before other models may have detected the data breach. Such a revelation may be invaluable to the acquiring party (and to the target system).

Accordingly, in response to the query to the fraud report database, the data security evaluation computing device may additionally generate and/or receive results of an additional review process identifying the likelihood the target system is a candidate for a CPP data breach.

The fraud report database may therefore be generally considered either a data source storing data representing whether the target system has been a subject of a past data breach (e.g., fraud reports indicating the target system was the source of a CPP data breach event), or a data source storing data associated with a potential for a future data breach at the target system (e.g., fraud reports not yet associated with a particular source of CPP data breach event or unrelated to a CPP data breach event).

The data security evaluation computing device may cache or store a local copy of any data received/retrieved from the fraud report database, such as the fraud reports, investigation reports, and/or list(s) of affected PANs, to enable quicker and more efficient future processing of the data without having to re-query the fraud report database. It should be understood that, in cases where no fraud reports are returned, the data security evaluation computing device does not cache any fraud reports. Alternatively, the data security evaluation computing device caches a proxy data element that indicates no fraud reports were returned from the fraud report database.

A second example data source may include a web resource review data source, which includes, in some embodiment, web resources of the target system and/or the target system itself. As used herein, "web resources" refer generally to websites or domains associated with the target system. The web resources may be directly maintained by the target system or may be maintained by one or more third parties. In one particular embodiment, the target system is a merchant target system whose web resources include log-in portals, payment web pages where products are purchased and/or payment details are entered, internal access pages (e.g., where internal users, such as managers or purchasing associates, and/or external users, such as vendor partners, access or input data), social media profiles, and the like.

The data security evaluation computing device is configured to execute an external review process of the security vulnerabilities in the target system's web presence. In alternative embodiments, the external review process is conducted by a computing device associated with the target system and/or a human analyst.

The data security evaluation computing device, for the external review process, performs various analyses and targeted procedures to identify where such websites and domains may be vulnerable to external threat. Such vulnerabilities include, for example, (i) unsecured web pages at which sensitive data is input or accessed, (ii) accessibility of "global" passwords or account information that can provide unauthorized access to sensitive data, (iii) any open data portals, and the like. The external review may be particularly focused on payment pages, such as payment portals or web pages in which sensitive payment information is entered by a user, or on openly accessible log-in pages. Vulnerabilities in such locations may leave the target system particularly susceptible to data breach, where fraudsters or data thieves may capture payment details, log-in information, or other sensitive or confidential information.

As part of the external review process, the data security evaluation computing device is configured to identify a plurality of web pages and/or domains that form the merchant target system's web resources (e.g., as a list of URLs or hyperlinks). The data security evaluation computing device is further configured to interact with one or more of these web pages and/or domains, and/or to transmit signals to the merchant target system, to identify vulnerabilities in the web resources of the merchant target system. For example, the data security evaluation computing device transmits test signals to the web pages and/or domains. The test signals include instructions, queries, or commands that initiate responses from the web pages and/or domains including one or more security data elements. For example, the test signals may query whether a particular log-in portal or payment page includes a valid security certificate or whether such a page is accessible without appropriate security credentials (e.g., without authentication of a user or user computing device). The response may include data elements having values that identify the status of various security components the web page and/or domain (e.g., a value of "0" in a security certificate data element if no security certificate was present on a payment page).

The data security evaluation computing device aggregates or compiles the results of the external review of the target system's web presence as external review analytics. The external review analytics may include not only the responses from the web pages and/or domains but may further include overall trends, averages, or particular identified issues. For example, the external review analytics may include an indicator that 3% of the reviewed web resources are inadequately secured, and/or an indicator that payment portals are secure but log-in portals are inadequately secured.

Certain aspects of the external review may be automated (e.g., by the data security evaluation computing device or another computing device associated with an analyst), such as identifying web pages, social media, or other public data associated with the target system and performing the analyses described above. In some embodiments, the external review analytics may be forwarded to a human analyst for further review or investigation.

In some embodiments, the data security evaluation computing device automatically performs the external review for the target system. In some embodiments, the data security evaluation computing device also generates a request for supplement review to be conducted and transmits the request to the web resource review data source, which may include a computing device associated with the human analyst. The request may be automatically queued in a request queue for the analyst upon being received from the data security evaluation computing device.

The external review analytics identify the vulnerabilities uncovered during the external review process. The vulnerabilities may be specifically identified (e.g., this particular web page features this particular vulnerability), or an overall vulnerability level or assessment may be provided qualitatively (e.g., high or low vulnerability) or quantitatively (e.g., as a web vulnerability sub-score).

The web presence review data source may therefore be generally considered either a data source storing data associated with a potential for a future data breach at the target system (e.g., facilitating access to external review analytics identifying particular vulnerabilities in the web presence of the target system).

The data security evaluation computing device may cache or store a local copy of the generated and/or received external review analytics to enable quicker and more efficient future processing of the data without having to query the web presence review data source.

As another example, a third data source may include an illicit threat data source facilitating access to data records of illicit threats against or associated with the target system. "Illicit threats," as used herein, refers generally to threats made against a target system on the "dark web" or at other sources of illicit activity (e.g., where stolen payment account information is distributed or where data breach attempts are planned or discussed). The data security evaluation computing device is configured to employ web-crawling functionality to crawl the dark web for text-based content associated with various illicit threats. Accordingly, the illicit threat data source may include the dark web. Additionally or alternatively, the illicit threat data source includes a database that stores content crawled by another computing device.

In some embodiments, the data security evaluation computing device is configured to crawl for or seek out illicit threats by searching text-based content identifying the target system, either by name or by an identified code name or pseudonym. Additionally or alternatively, the data security evaluation computing device searches text-based content for one or more PANs from a list. The list may include the list of affected PANs described above (i.e., including PANs identified as being used in a fraudulent transaction) or may include a list of PANs that have transacted with the merchant target system within a particular date range antedating the crawl. That is, the data security evaluation computing device seeks and stores any reference to either the target system or payment/account details associated with users of the target system.

The data security evaluation computing device stores any retrieved text-based content indexed by associated party (e.g., one or more merchants identified as breached or vulnerable) and/or by type of illicit behavior (e.g., stolen payment card number from an unsecured database or skimmed from a physical point-of-sale device). The results of the web-crawl are generally referred as an "illicit threat assessment." The illicit threat assessment may include the specific crawled text-based content or an aggregation or condensed version thereof. For example, the illicit threat assessment may include a number of "hits" (i.e., a number of times the target system was mentioned or identified) or an identifier of the type of illicit activity that was identified (e.g., an indicator of stolen payment card information or of other data exposure).

In some embodiments, as described herein, the data security evaluation computing device caches the crawled text-based content. In some embodiments, the data security evaluation computing device stores the text-based content in a specific illicit threat database. In such embodiments, the data security evaluation computing device may also query the illicit threat database using the identifier of the target system to request any additional text-based content not already identified by the data security evaluation computing device. The illicit threat database returns, in response to the query, any text-based content identified as being associated with the target system. The generated, stored, and/or retrieved illicit threat assessment(s) may enable the data security evaluation computing device to identify a potential data breach even where no fraud has yet been reported (e.g., when no fraud reports associated with a particular data breach are returned from the fraud report database).

The illicit threat data source, including the dark web and/or a database of stored text-based content may therefore be generally considered either a data source storing data representing whether the target system has been a subject of a past data breach (e.g., text-based content that indicates one or more bad actors have already breached the target system), or a data source storing data associated with a potential for a future data breach at the target system (e.g., text-based content indicating potential or planned data breaches associated with the target system).

The data security evaluation computing device may cache or store a local copy of the illicit threat assessment(s), to enable quicker and more efficient future processing of the data without having to re-query the illicit threat database and/or re-crawl the dark web. It should be understood that, in cases where no illicit threat assessments are returned, the data security evaluation computing device does not cache any illicit threat assessments. Alternatively, the data security evaluation computing device caches a proxy data element that indicates no illicit threat assessments were returned from the illicit threat database. In other embodiments, an illicit threat assessment is always generated and/or returned from the illicit threat database but may indicate that no illicit threats were identified (e.g., a value of "0" in a data element associated with a number of "hits").

A fourth example data source may include a compliance review data source storing and/or facilitating access to reports of the target system's compliance with certain data security standards. For example, in the electronic payment industry, parties to electronic payment transactions are subject to Payment Card Industry (PCI) compliance standards, related at least in part to data security. In at least some cases, acquiring banks report on the compliance of their contracting merchants in compliance assessments. The compliance assessments review, for example, firewalls, secure storage, security of remote access, two-factor authentication requirements, security of web portals, security patch implementation, monitoring and logging processes, penetration testing results, and the like. In some embodiments, compliance assessments include at least some self-reporting fields, where merchants provide answers to questions with or without verification of the answers. The compliance assessments also include at least some externally verifiable fields. For example, whether or not a merchant self-reports on their implementation of security patches, another party (e.g., a source of the patches, such as a payment processing network computing device) may store a record of requests for patches, patches sent to merchants, patches not sent to merchants, patch implementation verification records, and the like.

The data security evaluation computing device is configured to retrieve completed compliance assessments, for example, from a compliance review database storing these compliance assessments for a merchant target system. The compliance assessments may include indicators of which fields are self-reporting fields and which fields are externally verified and/or verifiable. Accordingly, in some embodiments, greater weight may be given to externally verified fields in determining a level of compliance of a merchant based on the compliance assessments.

The data security evaluation computing device queries the compliance review database with the identifier of the target system. The compliance review database returns all compliance assessments associated with the target system. The compliance review database may additionally or alternatively return an aggregated or condensed version of the compliance review assessments. For example, the compliance review database may return a report including a number of assessments available or a percentage of timely assessments completed.

Additionally or alternatively, the data security evaluation computing device is configured to transmit one or more compliance verification signals to the merchant target system. The compliance verification signals include one or more queries or instructions that, upon being processed at the merchant target system, cause the merchant target system to return a response signal including verification data elements that are used to verify information in the compliance assessments. For example, the compliance verification signal may include a query for a current version of a security patch that is installed or executed at the merchant target system. The response includes a verification data element having a value representative of the current version of the security patch. The data security evaluation computing device compares the returned verification data element with a reported data element from a compliance assessment to verify whether the most up-to-date security patch is installed at the merchant target system. As another example, the verification signal includes a query requesting indication of whether a firewall or a two-step authentication process is in place at a particular data access point (e.g., a web page or an access portal internal to the target system). The response includes a verification data element having a binary value representative of whether the firewall or two-step authentication process is implemented. The data security evaluation computing device compares the returned verification data element with a reported data element from a compliance assessment to verify the reported data element.

The compliance review data source, including the compliance review database and/or the target system itself, may therefore be generally considered a data source storing and/or facilitating access to data associated with a potential for a future data breach at the target system (e.g., compliance assessments identifying gaps in security procedures).

The data security evaluation computing device may cache or store a local copy of the compliance assessments and any verification responses, to enable quicker and more efficient future processing of the data without having to re-query the compliance review database and/or the target system. It should be understood that, in cases where no compliance assessments are returned, the data security evaluation computing device does not cache any compliance assessments. Alternatively, the data security evaluation computing device caches a proxy data element that indicates no compliance assessments were returned.

It should be readily understood that additional and/or alternative data sources may be accessed and/or additional and/or alternative data may be used than that explicitly described herein without departing from the scope of the present disclosure. For example, it is also contemplated that one data source may store external data including news reports, social media postings, and/or other external user-generated data.

The data security evaluation computing device is configured to receive and process the data from the plurality of data sources described herein. Specifically, the data security evaluation computing device is configured to process and analyze the generated, received, and/or retrieved data to generate a data security score associated with the target system. The data security score is used to indicate a likelihood that the target system has been the subject of a data breach and/or is vulnerable to a potential data breach. In some embodiments, the data security evaluation computing device first generates one or more "sub-scores" associated with generated/processed data and/or data retrieved from each data source, then combines those sub-scores to generate the (overall) data security score. For example, the data security evaluation computing device may generate a reported fraud sub-score, an external review sub-score, an illicit threat sub-score, and a compliance review sub-score. In the example embodiment, the data security evaluation computing device stores and retrieves scoring parameters to generate any of the above scores. The scoring parameters may define how various data affect the generated data security score, how to weight various data, the scoring scale, and the like. The scoring parameters may further define an output format for the data security score (e.g., just a numerical score, or a more detailed report including the score and contributing factors or recommendations).

To generate a reported fraud sub-score, or to factor the data from the fraud report database into the overall data security score, the data security evaluation computing device reviews the inactive and/or active fraud reports returned from the fraud report database. In some embodiments, the data security evaluation computing device retrieves the cached copy of the fraud reports for such analysis, thereby reducing process latency and reducing a number of queries to the fraud report database. Generally, a low number of fraud reports contributes to a positive or "good" reported fraud sub-score. Likewise, a lack of CPP breach records also positively contributes to the reported fraud sub-score. Conversely, high levels of reported fraud or an indicator that the target system was the source of a CPP data breach would have a negative impact on scoring.

To generate an external review sub-score, or to factor the data from the web resource review data source (e.g., the target system and/or the web resources thereof) into the overall data security score, the data security evaluation computing device reviews the external review analytics. In some embodiments, the data security evaluation computing device retrieves the cached copy of the external review analytics for such analysis, thereby reducing process latency and reducing a number of queries to the target system. Generally, a low number of identified vulnerabilities and/or a strong or positive report of the target system's web presence positively contributes to the external review sub-score. Conversely, higher numbers of identified vulnerabilities or an overall negative report of the target system's web presence would have a negative impact on scoring.

To generate an illicit threat sub-score, or to factor the illicit threat assessments into the overall data security score, the data security evaluation computing device reviews the illicit threat assessment(s) as generated based on crawled text-based content and/or as returned from the illicit threat database. In some embodiments, the data security evaluation computing device retrieves the cached copy of the illicit threat assessment(s) for such analysis, thereby reducing process latency and reducing a number of web-crawls and/or queries to the illicit threat database. Generally, a lack of identified illicit threats positively contributes to the illicit threat sub-score. Conversely, higher numbers of identified illicit threats would have a negative impact on scoring.

To generate a compliance sub-score, or to factor the compliance assessments into the overall data security score, the data security evaluation computing device reviews the compliance assessments returned from the compliance review database as well as the verification responses returned from the target system. In some embodiments, the data security evaluation computing device retrieves the cached copy of the compliance assessments and/or verification responses for such analysis, thereby reducing process latency and reducing a number of queries to the compliance review database and/or the target system. Generally, greater number of completed compliance assessments, strong compliance assessments indicating high levels of compliance, and/or positively trending compliance assessments positively contribute to the compliance sub-score. Moreover, certain externally verified fields of completed compliance assessments may be weighted higher than self-reporting fields. Incomplete compliance assessments or identified "gaps" in compliance (e.g., an identified failure to implement security patches) would have a negative impact on scoring.

The data security evaluation computing device analyzes and reviews the data from the data sources, as described herein, to generate an overall data security score for the target system. In one embodiment, the score falls within a predefined range (e.g., 1-100 or 1-1,000), and a higher score indicates a strong data security position or lower vulnerability to data breach. That is, receiving a higher score is "better" or more positive for the target system. Conversely, a lower score indicates a poorer data security position or higher vulnerability to data breach, such that receiving a lower score is "worse" or more negative for the target system.

Other scoring ranges or schemes are contemplated, such as a lower score being "better" or more positive, or scores ranging from negative numbers to positive numbers (e.g., −50 to 50).

Moreover, in the example embodiment, the data security evaluation computing device is further configured to generate a data security report including the overall data security score. The data security report may include additional data elements. For example, the data security report may include the above-described sub-scores or a summary of the data that went into calculating the sub-scores. As one particular example, the data security report may read, "The target system was identified as a CPP data breach source in 2016, which brought the score down 100 points." The data security report may include, as another example, recommendations to improve the data security score or to improve procedures that would ameliorate at least some susceptibility to data breach. As one particular example, the data security report may read, "We identified an unsecured log-in portal at [a particular hyperlink]. Securing this log-in portal would reduce the susceptibility to a data breach."

The data security report may include data that did not factor into the score calculation but that may be of interest to the acquiring party. For example, the data security evaluation computing device may retrieve (e.g., using a web crawler) or access (e.g., from another data source) news reports, social media posts, or other web content associated with the target system. The data security report may read, for example, "Some social media users are questioning whether the target system was breached, but we found no evidence of active or past data breaches."

The data security report may also include qualitative descriptors of the data security score or of the overall breach vulnerability associated with the target system. For example, the data security report may list the data security score, a data breach indicator, and a vulnerability indicator. The data breach indicator may be a binary indicator (e.g., "Yes/No") that indicates whether the target system has been breached. The vulnerability indicator may have a range of values (e.g., "Very Low," "Low," "Medium," "High," "Very High") indicating an overall vulnerability or susceptibility of the target system to a future data breach. Alternatively, the data security score may be a two-part score that indicates both whether the target system has been breached and the overall vulnerability or susceptibility of the target system to a future data breach. Data from the plurality of data sources factor into the data breach indicator and the vulnerability indicator differently. For example, the fraud reports may indicate whether the target system has been breached, whereas illicit threat assessments may reveal the target system is the subject of a plurality of illicit threats and therefore is particular susceptible to being breached.

The data security evaluation computing device compiles the data security report and generates a security review response message including the same. The data security evaluation computing device transmits the security review response message to the acquiring party for subsequent review thereat. The data security report including the data security score and the additional data elements described herein present not only a wide-ranging review of the current status of the target system's data breach position but also an opportunity for the acquiring party and/or the target system to correct various vulnerabilities or bad practices to improve the data security score or reduce the likelihood of data breach at the target system.

The technical problems addressed by this system include at least one of: (i) undetected network-based data breach events at an target system; (ii) unavailability of transaction or transaction-related data during due diligence in acquiring or merging with a target business; (iii) a lack of data aggregation between disparate data sources to comprehensively determine a target system's data security position; (iv) inability to transform encrypted or sensitive data into a format usable for reviewing data security of a target system; and (v) inability to directly query the target system or the web resources thereof.

The methods and systems described herein may be implemented using computer programming or engineering techniques including computer software, firmware, hardware, or any combination or subset thereof, wherein the technical effects may be achieved by performing at least one of the following steps: (a) receiving a security review request message requesting a data security review for an target system, the security review request message including an identifier of the target system; (b) querying, using the identifier of the target system, a first data source of the plurality of data sources, to receive data representing whether the target system has been a subject of a past data breach; (c) locally caching, in the memory device, the data representing whether the target system has been a subject of a past data breach; (d) querying, using the identifier of the target system, a second data source of the plurality of data sources, to receive data associated with a potential for a future data breach at the target system; (e) locally caching, in the memory device, the data associated with the potential for a future data breach at the target system; (f) generating a data security score by analyzing the locally cached data, the data security score representing a likelihood that the target system has been the subject of a data breach and is vulnerable to a future data breach; (g) compiling the data security score and one or more additional data elements into a data security report, the one or more additional data elements including a recommendation to reduce vulnerability to a future data breach at the target system; and (h) transmitting, to the acquiring party computing device, a security review response message including the data security report.

The resulting technical effect achieved by this system is at least one of: (i) identifying whether an entity has been the subject of a data breach using publicly inaccessible and/or encrypted data; (ii) early detection of a data breach based on automatically initiated supplemental review; (iii) aggregation of data from disparate, publicly inaccessible data to comprehensively determine a target system's data security position; (iv) improved access to retrieved data in local caches for analysis, avoiding repetitive and bandwidth-intensive database queries; and (v) transformation of such data into a format usable for reviewing data security of the target system (i.e., as a data security score and/or data security report).

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DH2, Microsoft® SQL Server, Sybase®, and PostgreSQL. However, any database may be used that enables the systems and methods described herein.

(Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a "processor" may include any programmable system including systems using central processing units, microprocessors, micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In some embodiments, the computer program utilized a Structured Query Language (SQL) with a client user interface front-end for administration and a web interface for standard user input and reports. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "fraud" is used in the context of payment card transactions and refers, generally, to an unprivileged use of a payment card. For example, a thief may steal a consumer's payment card or information from that payment card (e.g., a payment account number [PAN], expiration date, security code) and attempt to use the payment card for purchases.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic block diagram of a computing system 100 for evaluating data security of a target system 101. For example, a particular target system 101 (e.g., a merchant) may experience a data breach, such that a plurality of payment cards, payment account details, or other sensitive consumer data are compromised. That is, personally identifiable information or payment card data has been captured by fraudsters.

Computing system 100 includes a data security evaluation computing device 102 configured to determine a likelihood target system 101 has been or could, in the future, be the subject of a data breach. In the example embodiment, data security evaluation computing device 102 is integral to or is otherwise closely associated with a payment card interchange network (not shown) configured to process payment card transactions.

Data security evaluation computing device 102, in the example embodiment, is communicatively coupled to an acquiring party computing device 104 and a plurality of data sources 112, for example, over the internet, a virtual private network (VPN), or any other data network. Acquiring party computing device 104 is associated with an acquiring party—that is, a party acquiring (or merging with) the business associated with target system 101. The acquiring party is therefore interested in the likelihood that target system 101 has been or could be the subject of a data breach. Data security evaluation computing device 102 is further in communication with target system 101, which may be considered an additional data source 112, as described further herein.

In the example embodiment, one or more of data sources 112 are maintained by the payment card interchange network. That is, data sources 112 include transaction and transaction-related data. Transaction data and transaction-related data are useful to data security evaluations, particular for merchant target systems. Specifically, as described further herein, investigations into whether payment cards that have transacted at a merchant target system 101 are later associated with fraud indicates either a data breach or some level of vulnerability to a data breach. Moreover, transaction data and transaction-related data are stored in encrypted, anonymized, and/or otherwise secured formats, and such data is confidential or unavailable to parties outside of the payment card interchange network (i.e., inaccessible to acquiring party computing device 104). Because data security evaluation computing device 102 is integral to or closely associated with the payment card interchange network, data security evaluation computing device 102 includes suitable decryption and data security functionality that enables data security evaluation computing device 102 to access and process data from data sources 112.

As shown in FIG. 1, data security evaluation computing device 102 receives a security review request message 106 from acquiring party computing device 104. Security review request message 106 includes at least an identifier 110 of target system 101. Identifier 110 may include one or more names of target system 101 (e.g., the name as incorporated as well as a "doing business as" trade name). Data security evaluation computing device 102 stores identifier 110 in a memory thereof, such as a cache 114. Cache 114 may include random access memory. Data security evaluation computing device 102 may include additional or alternative memory devices, including permanent storage devices (e.g., a hard disk). Data security evaluation computing device 102 may store identifier 110 in the format as received, and/or may convert identifier 110 into one or more additional or alternative formats. For example, data security evaluation computing device 102 may retrieve a particular alphanumeric merchant identifier used by the payment card interchange network to particular identify target system 101, and may further store that merchant identifier as part of identifier 110. Data security evaluation computing device 102 may additionally or alternatively retrieve an IP address or other computing device identifier of target system 101, and may further store the computing address identifier as part of identifier 110. That is, data security evaluation computing device 102 may store a plurality of formats or versions of identifier 110, to identify target system 101 to multiple data sources 112 in appropriate formats suitable to each data source 112.

Data security evaluation computing device 102 is configured to retrieve data from data source 112 and to aggregate and analyze such data to generate a data security score and/or an associated data security assessment that incorporates past, present, and future data security vulnerabilities to present a comprehensive perspective of the data security position of the target system.

Figure 2:
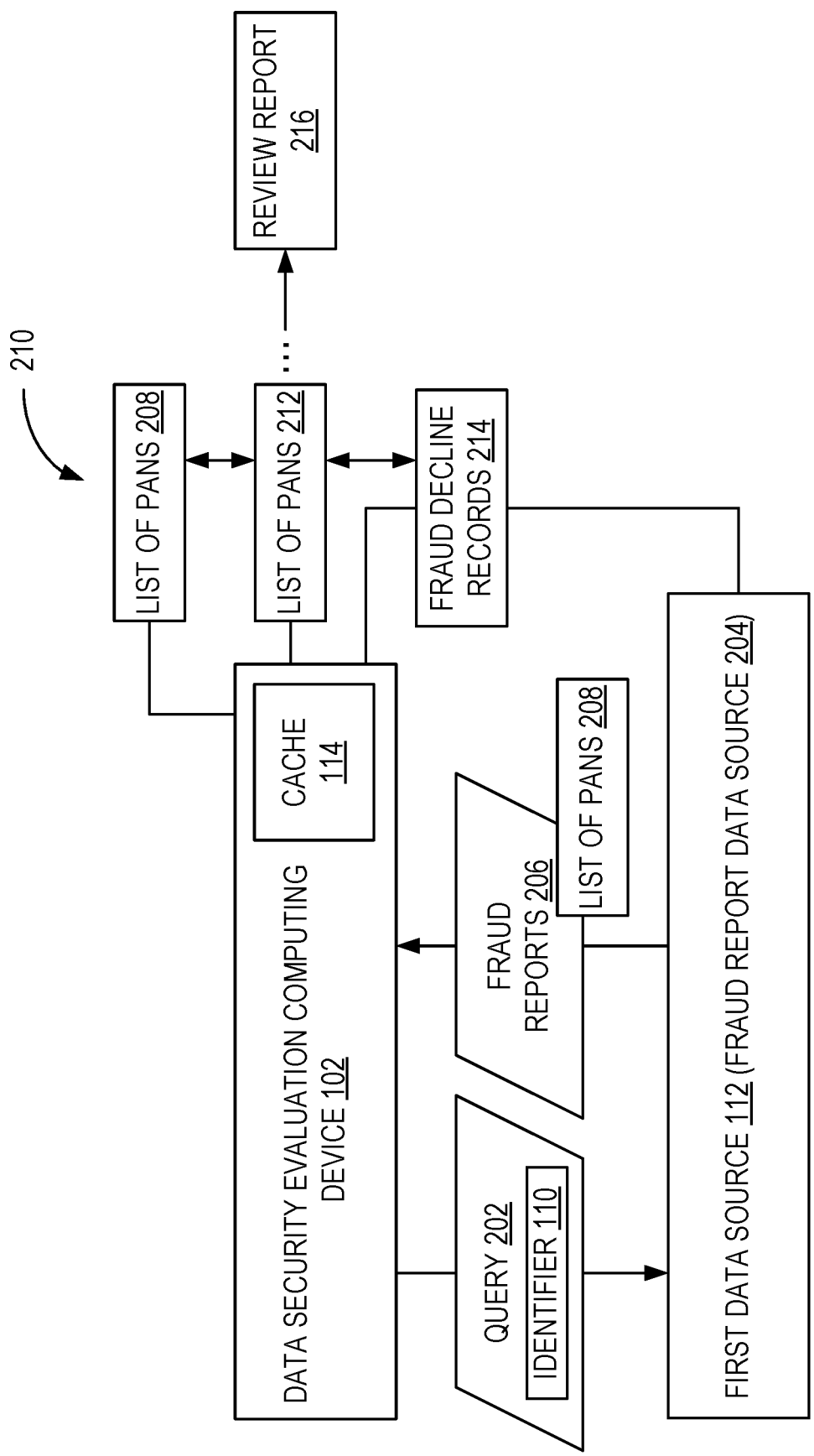

FIG. 2 illustrates a simplified data flow between data security evaluation computing device 102 and a first data source 112. In the illustrated embodiment, first data source 112 includes a fraud report data source 204, which stores (e.g., in a database) or otherwise facilitates access to inactive fraud reports (e.g., reported fraud for which an investigation has been completed and remedial action has been taken) and active fraud reports (e.g., reported fraud still undergoing investigation and/or remediation). Fraud report data source 204 may also store reported transactions that were declined due to suspected fraud. For example, a transaction may be declined during processing based on the outcome of various fraud models or authentication procedures.

Data security evaluation computing device 102 transmits a query 202 to fraud report data source 204 using identifier 110 (e.g., a merchant identifier) of target system 101 (shown in FIG. 1). Fraud report data source 204 returns any inactive and/or active fraud reports 206 associated with that identifier 110. In some embodiments, fraud report data source 204 returns individual fraud reports 206 or an aggregation thereof, such as a total number of fraud reports. In some embodiments, fraud report data source 204 returns, as part of fraud reports 206 or in separate data file(s), the results of any investigation into reported fraud, such as CPP data breach reports that identify target system 101 as the source of a CPP data breach. Moreover, in some embodiments, fraud report data source 204 returns, as part of fraud reports 206 or in separate data file(s), a list of payment account identifiers (e.g., payment account numbers or PANs) 208 associated with fraud reports 206, referred to as a list of "affected PANs" 208. Additionally or alternatively, data security evaluation computing device 102 is configured to parse all returned fraud reports 206 for the PANs and locally generate the list of affected PANs 208.

In some embodiments, receiving query 202 at fraud report data source 204 automatically initiates an additional review process 210 at fraud report data source 204. Review process 210 is a new or supplemental review of any fraud reports 206 associated with target system 101. For example, additional review process 210 includes a review of all (or a portion of) fraud reports 206 associated with a merchant target system 101. Review process 210 includes data security evaluation computing device 102 subjecting fraud reports 206 associated with target system 101 (as identified using identifier 110) to a particular CPP review with lower thresholds defining a potential data breach. That is, the standards for a potential data breach are lowered in review process 210, to provide a more granular review of the likelihood that target system 101 has been subject to a data breach. In at least some cases, review process 210 reveals the presence of a data breach or a potential data breach that other models did not detect.

Data security evaluation computing device 102 (or another computing device associated with fraud report data source) processes all fraud reports 206 with updated data breach modeling thresholds and/or algorithms associated with merchant target system 101 to determine whether merchant target system 101 is a likely or potential source of a CPP data breach. Data security evaluation computing device 102 may generate a list of PANs 212 that have transacted with the merchant target system for a period of time antedating the review process and compare that list of PANs 212 to the list of affected PANs 208 to identify any common PANs therebetween. Data security evaluation computing device 102 may additionally or alternatively retrieve fraud decline records 214 from fraud report data source 204 and compare the list of PANs 212 to the fraud decline records 214 to identify any common PANs therebetween. Common PANs may represent additional, previously undetected fraud.

Data security evaluation computing device 102 generates a review report 216 upon completion of review process 210. Review report 216 includes the result of review process 210—that is, whether review process 210 identified a likely data breach. Review report 216 may include a binary data breach indicator (e.g., values representing either "yes" or "no" with respect to a potential data breach) or may include a ranged data breach indicator (e.g., values representing "very unlikely," "unlikely," "likely," "very likely," or the like).

Data security evaluation computing device 102 stores a local copy of fraud reports 206, lists 208, 212, and/or review report 216 in cache 114. It should be understood that, in cases where no fraud reports 206 are returned, data security evaluation computing device 102 does not cache any fraud reports 206. Alternatively, data security evaluation computing device 102 caches a proxy data element (not shown) that indicates no fraud reports 206 were returned from fraud report data source 204.

Figure 3:
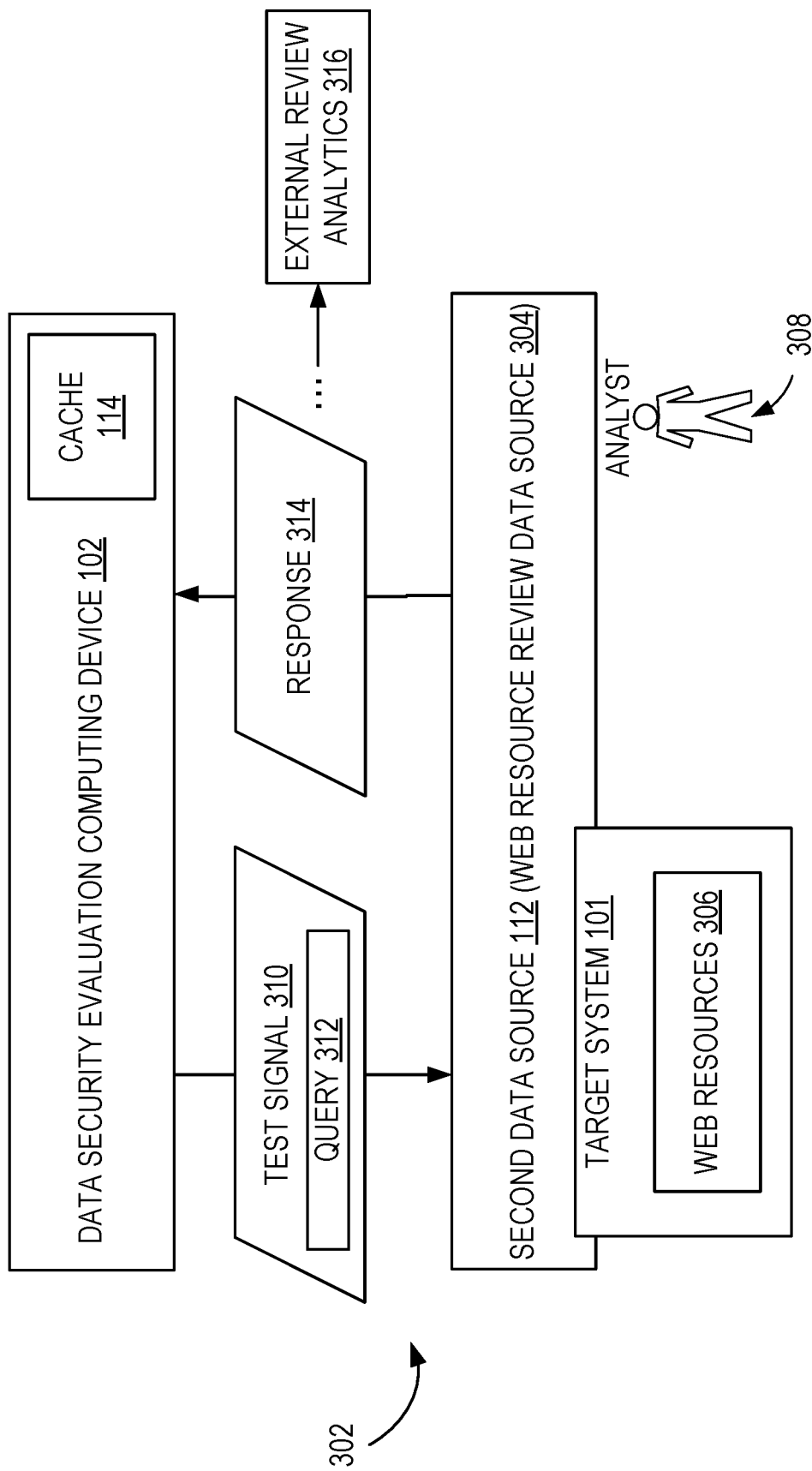

FIG. 3 illustrates a simplified data flow between data security evaluation computing device 102 and a second data source 112. In the illustrated embodiment, second data source 112 includes a web resource review data source 304, which includes, in some embodiments, web resources 306 of target system 101 and/or target system 101 itself. In one particular embodiment, target system 101 is a merchant target system 101 whose web resources 306 include log-in portals, payment web pages where products are purchased and/or payment details are entered, internal access pages (e.g., where internal users, such as managers or purchasing associates, and/or external users, such as vendor partners, access or input data), social media profiles, and the like.

Data security evaluation computing device 102 is configured to execute an external review process 302 of the security vulnerabilities in the target system's web resources 306. In alternative embodiments, external review process 302 is conducted by a computing device (not shown) associated with target system 101 and/or a human analyst 308.

Data security evaluation computing device 102, for external review process 302, performs various analyses and targeted procedures to identify where web resources 306 may be vulnerable to external threat. External review process 302 may be particularly focused on payment pages, such as payment portals or web pages in which sensitive payment information is entered by a user, or on openly accessible log-in pages. Vulnerabilities in such locations may leave target system 101 particularly susceptible to data breach, where fraudsters or data thieves may capture payment details, log-in information, or other sensitive or confidential information.

As part of external review process 302, data security evaluation computing device is configured to identify a plurality of web pages and/or domains that form the merchant target system's web resources 306 (e.g., as a list of URLs or hyperlinks). Data security evaluation computing device 102 is further configured to interact with one or more of these web pages and/or domains, and/or to transmit signals to merchant target system 101, to identify vulnerabilities in web resources 306. For example, data security evaluation computing device 102 transmits test signals 310 to the web pages and/or domains. Test signals 310 include instructions, queries, or commands that initiate responses from the web pages and/or domains including one or more security data elements. Specifically, test signals 310 include a query 312 associated with a security feature of a web page (e.g., whether a particular log-in portal or payment page includes a valid security certificate or whether such a page is accessible without appropriate security credentials). Query 312 automatically causes a response 314 to be returned from the webpage, each response 314 including a status of the security feature on the queried web page. For example, response 314 may include data elements having values that identify the status of various security components the web page and/or domain (e.g., a value of "0" in a security certificate data element if no security certificate was present on a payment page).

Data security evaluation computing device 102 aggregates or compiles the results of external review process 302 as external review analytics 316. External review analytics 316 may include not only responses 314 from web resources 306 but may further include overall trends, averages, or particular identified issues. For example, external review analytics 316 may include an indicator that 3% of the reviewed web resources 306 are inadequately secured, and/or an indicator that payment portals are secure but log-in portals are inadequately secured.

In some embodiments, data security evaluation computing device 102 automatically performs external review process 302. In some embodiments, data security evaluation computing device 102 also generates a request (not shown) for supplement review to be conducted and transmits the request to web resource review data source 304, which may include a computing device associated with analyst 308. The request may be automatically queued in a request queue for analyst 308 upon being received from data security evaluation computing device 102.

Data security evaluation computing device 102 stores a local copy of external review analytics 316 and/or responses 314 in cache 114.

Figure 4:
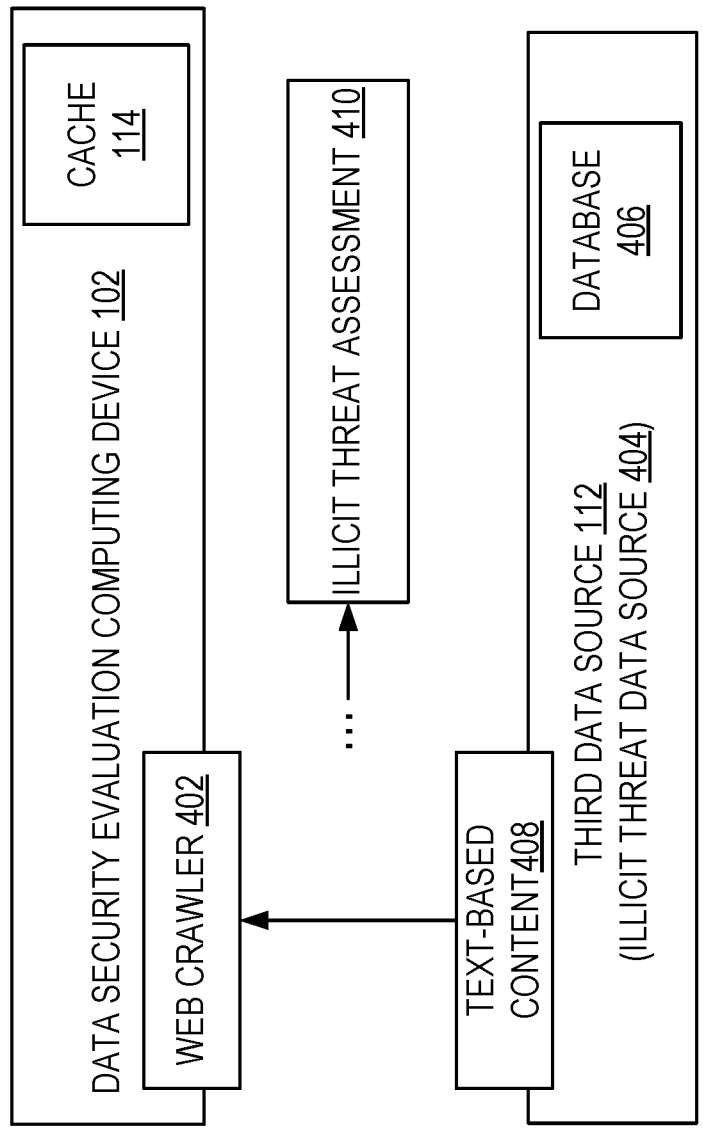

FIG. 4 illustrates a simplified data flow between data security evaluation computing device 102 and a third data source 112. In the illustrated embodiment, third data source 112 includes an illicit threat data source 404 facilitating access to data records of illicit threats against or associated with target system 101 (shown in FIG. 1). Data security evaluation computing device 102 is configured to execute a web crawler 402 to crawl the dark web for text-based content associated with various illicit threats. Accordingly, illicit threat data source 404 may include the dark web. Additionally or alternatively, illicit threat data source 404 includes a database 406 that stores content crawled by another computing device (not shown).

Web crawler 402 configured to crawl for or seek out illicit threats by searching text-based content 408 identifying target system 101, either by name or by an identified code name or pseudonym. Additionally or alternatively, web crawler 402 searches text-based content 408 for one or more PANs from a list (not shown). The list may include the list of affected PANs 208 (shown in FIG. 2, including PANs identified as being used in a fraudulent transaction) or may include a list of PANs that have transacted with the merchant target system within a particular date range antedating the crawl (e.g., list of PANs 212, also shown in FIG. 1). That is, web crawler 402 seeks and stores text-based content 408 that references either target system 101 or payment/account details associated with users of target system 101.

Data security evaluation computing device 102 stores any retrieved text-based content 408, indexed by associated party (e.g., one or more merchants identified as breached or vulnerable) and/or by type of illicit behavior (e.g., stolen payment card number from an unsecured database or skimmed from a physical point-of-sale device). Data security evaluation computing device 102 stores the results of the web-crawl (i.e., the retrieved text-based content 408) as an illicit threat assessment 410. Illicit threat assessment 410 may include specific crawled text-based content 408 or an aggregation or condensed version thereof. For example, illicit threat assessment 410 may include a number of "hits" (i.e., a number of times the target system was mentioned or identified) or an identifier of the type of illicit activity that was identified (e.g., an indicator of stolen payment card information or of other data exposure).

Data security evaluation computing device 102 stores a local copy of illicit threat assessment 410 in cache 114. It should be understood that, in cases where no illicit threat assessments 410 are returned (i.e., no evidence of "chatter" on the dark web associated with target system 101 has been found), data security evaluation computing device 102 does not cache any illicit threat assessments 410. Alternatively, data security evaluation computing device 102 caches a proxy data element (not shown) that indicates no illicit threat assessments 410 were generated and/or no text-based content 408 was returned from illicit threat database 406. In other embodiments, an illicit threat assessment 410 is always generated but may indicate that no illicit threats were identified (e.g., illicit threat assessment 410 includes a value of "0" in a data element associated with a number of "hits").

Figure 5:
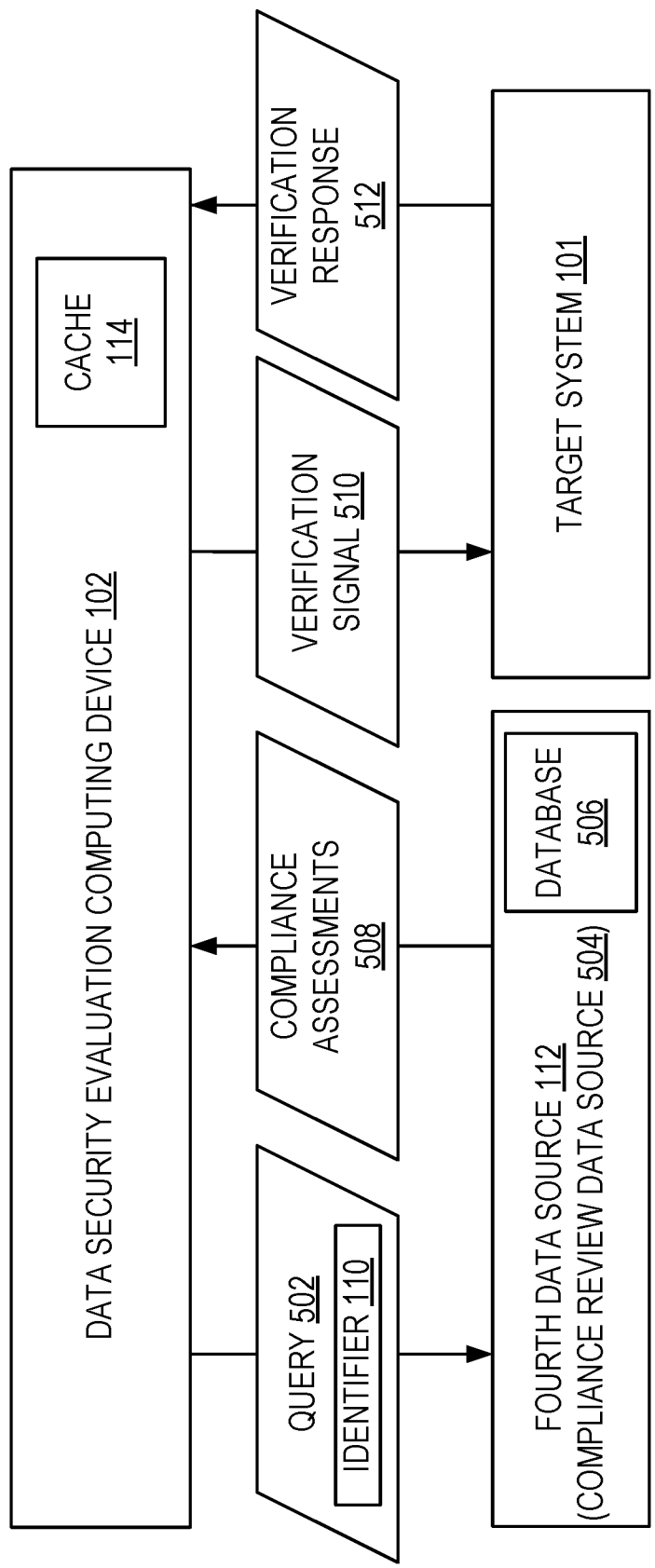

FIG. 5 illustrates a simplified data flow between data security evaluation computing device 102 and a fourth data source 112. In the illustrated embodiment, fourth data source 112 includes a compliance review data source 504 storing and/or facilitating access to reports of the target system's compliance with certain data security standards.

Data security evaluation computing device 102 is configured to retrieve completed compliance assessments 508 associated with a merchant target system 101, for example, from a compliance review database 506 storing compliance assessments 508 for merchant target system 101. Compliance assessments 508 may include indicators of which fields are self-reporting fields and which fields are externally verified and/or verifiable. Data security evaluation computing device 102 transmits a query 502 to compliance review database 506, including identifier 110 of target system 101. Compliance review database 506 returns all compliance assessments 508 associated with target system 101. Compliance review database 506 may additionally or alternatively return an aggregated or condensed version of compliance assessments 508. For example, compliance review database 506 may return a report (not shown) including a number of assessments 508 available or a percentage of timely assessments 508 completed by target system 101. Compliance assessments 508 may include indicators of which fields of each assessment 508 are self-reporting fields and which fields are externally verified and/or verifiable.

Data security evaluation computing device 102 transmits a compliance verification signal 510 to merchant target system 101. Verification signal 510 includes one or more queries or instructions that, upon being processed at merchant target system 101, cause merchant target system 101 to return a response signal 512 including verification data elements that are used to verify information in compliance assessments 508. For example, compliance verification signal 510 may include a query for a current version of a security patch that is installed or executed at merchant target system 101. Response signal 512 includes a verification data element having a value representative of the current version of the security patch. Data security evaluation computing device 102 compares the returned verification data element with a reported data element from a compliance assessment 508 to verify whether the most up-to-date security patch is installed at merchant target system 101. As another example, verification signal 510 includes a query requesting indication of whether a firewall or a two-step authentication process is in place at a particular data access point (e.g., a web page or an access portal internal to target system 101). Response signal 512 includes a verification data element having a binary value representative of whether the firewall or two-step authentication process is implemented. Data security evaluation computing device 102 compares the returned verification data element with a reported data element from a compliance assessment 508 to verify the reported data element.

Data security evaluation computing device 102 stores a local copy of compliance assessments 508 and/or response signals 512 in cache 114. It should be understood that, in cases where no compliance assessments 508 are returned, data security evaluation computing device 102 does not cache any compliance assessments 508. Alternatively, data security evaluation computing device 102 caches a proxy data element (not shown) that indicates no compliance assessments 508 were returned from compliance review database 506.

Figure 6:
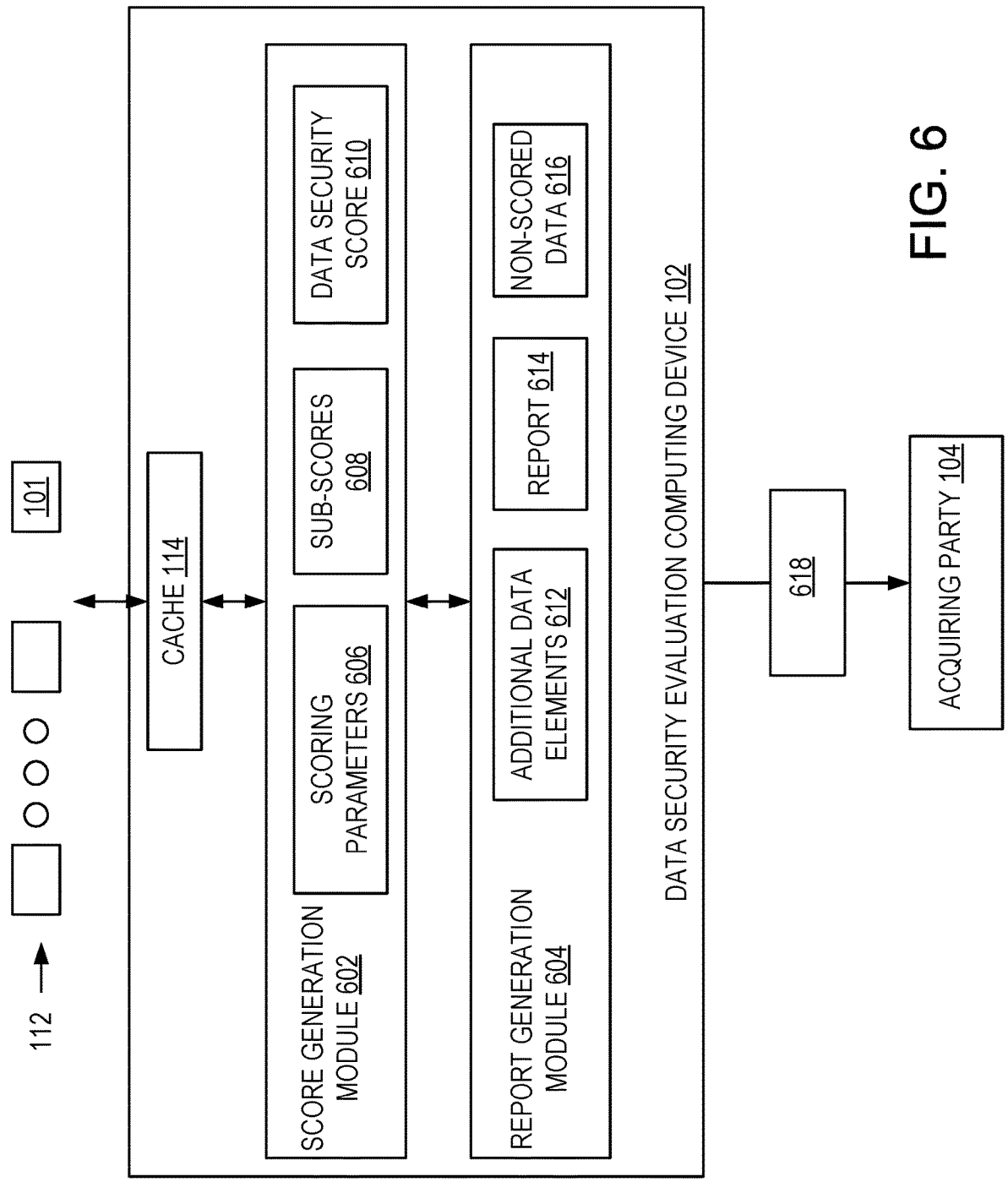

FIG. 6 is a schematic diagram of data security evaluation computing device 102 generating a security review response message associated with a target system 101. In the illustrated embodiment, data security evaluation computing device 102 includes cache 114, as described above, as well as a score generation module 602 and a report generation module 604. Generally, score generation module 602 is configured to generate a data security score (e.g., score 610) based on cached data generated based on responses from data sources 112 and/or received from data sources 112 and/or target system 101, and report generation module 604 is configured to generate a more comprehensive and descriptive report (e.g., report 614) including the data security score and additional data elements (e.g., additional data elements 612).

As described herein, data security evaluation computing device 102 is configured to store, in cache 114, data relevant to target system 101. Data security evaluation computing device 102 is configured execute score generation module 602 to process and analyze data stored in cache 114 to generate a data security score 610 associated with target system 101. Data security score 610 represents a likelihood that target system 101 has been the subject of a data breach and/or is vulnerable to a data breach. In some embodiments, score generation module 602 first generates one or more "sub-scores" 608 associated with generated, retrieved, and/or received data, then combines sub-scores 608 to generate (overall) data security score 610. For example, score generation module 602 may generate a reported fraud sub-score, an external review sub-score, an illicit threat sub-score, and a compliance review sub-score. In the example embodiment, score generation module 602 also stores and retrieves scoring parameters 606 to generate any of the above scores 608, 610. Scoring parameters 606 define how various data affect data security score 610, how to weight various data, a scoring scale, and the like. Scoring parameters 606 further define an output format for data security score 610 and/or data security report 614.

To generate a reported fraud sub-score 608, or to factor fraud reports 206 and/or review report 216 (shown in FIG. 2) into data security score 610, score generation module 602 reviews inactive and/or active fraud reports 206 returned from fraud report data source 204 (also shown in FIG. 2) and review report 216. Specifically, score generation module 602 retrieves the local copy of fraud reports 206 and/or review report 216 stored in cache 114. Generally, a low number of fraud reports 206 contributes to a positive reported fraud sub-score 608. Likewise, a lack of CPP data breach records in fraud reports 206 and/or review report 216 also positively contributes to reported fraud sub-score 608. Conversely, high levels of reported fraud or an indicator that the target system was the source of a CPP data breach negatively impact reported fraud sub-score 608.

To generate an external review sub-score 608, or to factor external review analytics 316 (shown in FIG. 3) into data security score 610, score generation module 602 reviews external review analytics 316 generated during review process 302. Specifically, score generation module 602 retrieves the local copy of external review analytics 316 stored in cache 114. Generally, a low number of identified vulnerabilities and/or a strong or positive report of the target system's web presence, as defined in external review analytics 316, positively contributes to external review sub-score 608. Conversely, higher numbers of identified vulnerabilities or an overall negative report of the target system's web presence negatively impact external review sub-score 608.

To generate an illicit threat sub-score 608, or to factor illicit threat assessment 410 (shown in FIG. 4) into data security score 610, score generation module 602 reviews any generated and/or received illicit threat assessment 410. Specifically, score generation module 602 retrieves the local copy of illicit threat assessment 410 stored in cache 114. Generally, a lack of identified illicit threats, as defined in illicit threat assessment 410, positively contributes to illicit threat sub-score 608. Conversely, higher numbers of identified illicit threats negatively impacts illicit threat sub-score 608.

To generate a compliance sub-score 608, or to factor compliance assessments 508 and/or verification response signals 512 (both shown in FIG. 5) into data security score 610, score generation module 602 reviews compliance assessments 508 returned from compliance review database 504 (also shown in FIG. 5) and response signals 512 received from target system 101. Specifically, score generation module 602 retrieves the local copy of compliance assessments 508 and/or response signals 512 from cache 114. Generally, greater number of completed compliance assessments 508, strong compliance assessments 508 indicating high levels of compliance, and/or positively trending compliance assessments 508 positively contribute to compliance sub-score 608. Moreover, certain externally verified fields of completed compliance assessments 508 (based on response signals 512) may be weighted higher than self-reporting fields. Incomplete compliance assessments 508 or identified "gaps" in compliance (e.g., an identified failure to implement security patches) negatively impact compliance sub-score 608.

Score generation module 602 analyzes and reviews the generated, retrieved, and/or received data and/or compiles sub-scores 608 to generate (overall) data security score 610 for target system 101. Score generation module 602 generates data security score 610 according to scoring parameters 606. In one embodiment, data security score 610 falls within a predefined range (e.g., 1-100 or 1-1,000) defined by scoring parameters 606, and a higher data security score 610 indicates a lower vulnerability to data breach. That is, receiving a higher data security score 610 is "better" or more positive for target system 101. Conversely, a lower data security score 610 indicates a higher susceptibility to data breach, such that receiving a lower data security score 610 is "worse" or more negative for target system 101. Other scoring ranges or schemes are contemplated, such as a lower data security score being "better" or more positive, and/or data security scores ranging from negative numbers to positive numbers (e.g., −50 to 50).

Report generation module 604 leverages data security score 610 and the analyses performed at score generation module 602 to generate a data security report 614 (which includes data security score 610 and, in some embodiments, sub-scores 608). In one embodiment, report generation module 604 formats data security report 614 according to a format defined in scoring parameters 606. Report generation module 604, in some embodiments, generates additional (e.g., qualitative or text-based) data elements 612 by parsing the analyzed data for sources or descriptors of various scoring factors. As one particular example, report generation module 604 determines target system 101 has been the subject of a data breach (e.g., based on a fraud report 206 and/or review report 216). Report generation module 604 then generates an additional data element 612 including a text string that reads, "The target system was identified as a CPP data breach source in 2016, which brought the score down 100 points."

As another example, report generation module 604 determines target system 101 has certain data vulnerabilities on publicly accessible web resources 306 (shown in FIG. 3, e.g., based on external review analytics 316). Report generation module 604 then generates an additional data element 612 representing a recommendation to improve the data security practices of the target system. For example, the recommendation data element 612 includes a text string that reads, "We identified an unsecured log-in portal at [a particular hyperlink]. Securing this log-in portal would reduce vulnerability to a data breach."

In other embodiments, report generation module 604 is further configured to retrieve non-scored data 616 from at least one data source 112. For example, one data source 112 stores web-based data including news reports, social media postings, and/or other publicly accessible and external user-generated web data. Report generation module 604 queries data source 112 including the web-based data using identifier 110 (shown in FIG. 1) of target system 101 to retrieve web-based data associated with target system 101 (i.e., non-scored data 616). Report generation module 604 parses non-scored data 616 for particular terms associated with data security and executes one or more correlation algorithms to determine whether, if at all, any of non-scored data 616 correlates to data security score 610 and/or any data from other data sources 112. For example, report generation module 604 may identify social media data in non-scored data 616 including terms such as "breach," "data," "secure", and the like. Report generation module 604 generates an additional data element 612 including a text string that reads, "Some social media users are questioning whether the target system was breached, but we found no evidence of active or past data breaches."

Report generation module 604 may also generate additional data elements 612 including qualitative descriptors of data security score 610 or of various data security factors for target system 101. For example, additional data elements 612 may include a data breach indicator and a vulnerability indicator. The data breach indicator may be a binary indicator (e.g., "Yes/No") that indicates whether target system 101 has been breached. The vulnerability indicator may have a range of values (e.g., "Very Low," "Low," "Medium," "High," "Very High") indicating an overall potential or likelihood that target system 101 could be subject to a data breach in the future. Alternatively, data security score 610 may be a two-part score that indicates both whether target system 101 has been breached and the overall likelihood that target system 101 could be subject to a data breach in the future. Report generation module 604 factors data from the plurality of data sources differently in generating the data breach indicator and the vulnerability indicator. For example, fraud reports 206 may indicate whether target system 101 has been breached, whereas illicit threat assessments 410 may reveal target system 101 is the subject of a plurality of illicit threats and therefore has a relatively high likelihood of being breached of no data security steps are taken.

Report generation module 604 compiles data security score 610 and additional data elements 612 to generate data security report 614 including the same. Data security evaluation computing device 102 then generates a security review response message 618 including data security score 610 and/or data security report 614 Data security evaluation computing device 102 transmits security review response message 618 to acquiring party computing device 104 for subsequent review thereat.

Figure 7:
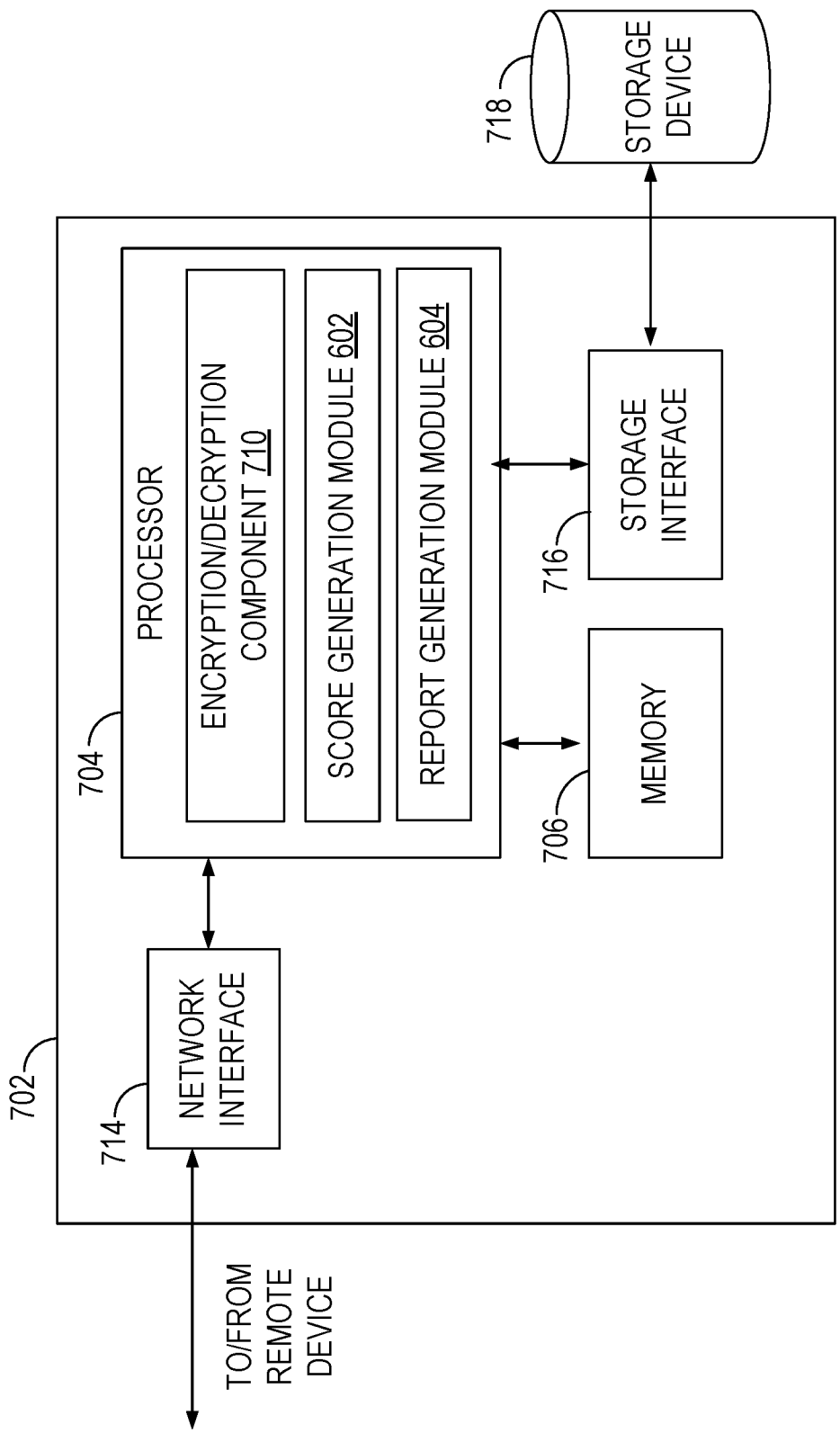

FIG. 7 depicts an example configuration of a computing device 702, including a processor 704 for executing instructions. Computing device 702 may be used to implement data security evaluation computing device 102 (shown in FIG. 1). Instructions are stored in a memory area 706, for example. Processor 704 includes one or more processing units (e.g., in a multi-core configuration), and is operable to execute an encryption/decryption component 710, score generation module 602, and/or report generation module 604. Encryption/decryption component 710 and modules 602 and 604 may include specialized instruction sets, coprocessors, and/or kernel extensions.

Encryption/decryption component 710 is configured generate and encrypt/decrypt data, such as queries and responses and data stored in encrypted data sources 112 (shown in FIG. 1). Encryption/decryption component 710 may be configured to encrypt and decrypt data based on public and/or private keys. For example, certain data in data sources 112 is encrypted using a RSA (Rivest-Shamir-Adelman) encryption public key associated with payment car interchange network. In another example, data in data sources 112 may be encrypted using AES (Advanced Encryption Standard) encryption. In some embodiments, encryption/decryption component 710 includes specialized processor instructions configured to encrypt/decrypt data. In another embodiment, encryption component 710 may include an encryption/decryption optimized coprocessor connected to processor 704.

Processor 704 is operatively coupled to a first communication (i.e., network) interface 714. In some embodiments, network interface 714 is configured to communicate with remote device(s) such as data sources 112 and/or acquiring party computing device 104 (shown in FIG. 1). In some embodiments, network interface 714 is a virtual interface. In certain embodiments, network interface 714 is associated with a respective network address, such as an IP ("internet protocol") address. In other embodiments, network interface 714 is associated with physical network links. For example, network interface 714 may receive network packets from remote devices via Ethernet, using a switching device. Network interface 714 may include a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). Network interface 714 may be configured to transmit queries and/or receive responses.

Processor 704 is operatively coupled to a storage device 718. Storage device 718 is any computer-operated hardware suitable for storing and/or retrieving data. In some embodiments, storage device 718 is integrated in server computing device 702. For example, server computing device 702 may include one or more hard disk drives as storage device 718. In other embodiments, storage device 718 is external to server computing device 702 and is remotely accessed by server computing devices 702. For example, storage device 718 may include multiple storage units such as hard disks or solid state disks in a redundant array of inexpensive disks (RAID) configuration, or may include a storage area network (SAN) and/or a network attached storage (NAS) system. Storage device 718 may include cache 114 and/or data sources 112.

In some embodiments, processor 704 is operatively coupled to storage device 718 via a storage interface 716. Storage interface 716 is any component capable of providing processor 704 with access to storage device 718. Storage interface 716 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 704 with access to storage device 716.

Memory area 706 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 8:
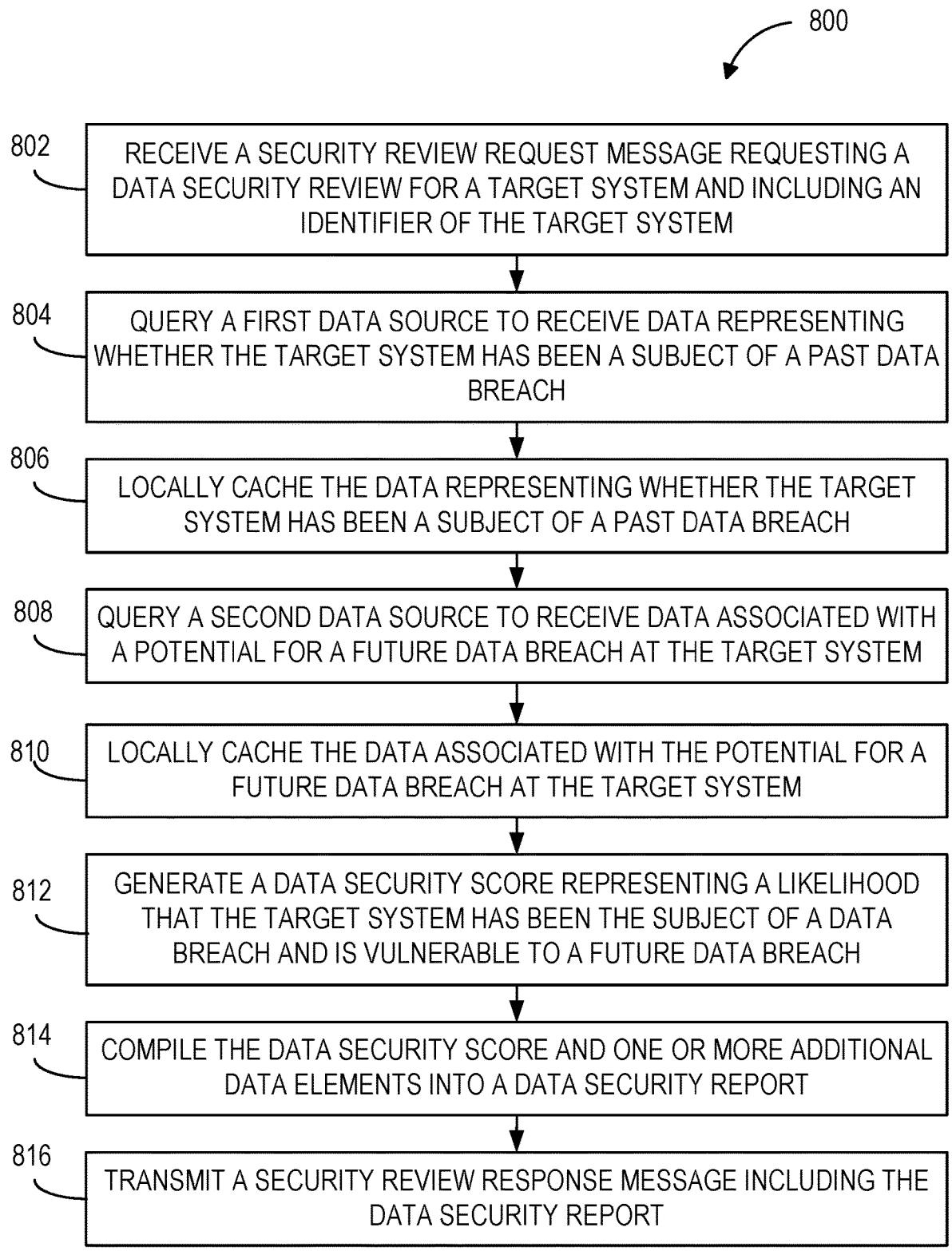

FIG. 8 is a flow diagram of a computer-implemented method 800 for evaluating data security of a target system. Method 800 is implemented using at least one computing device, such as data security evaluation computing device 102 (shown in FIG. 1). The at least one computing device has at least one processor, such as processor 704 (shown in FIG. 7), and the at least one processor performs the steps of the method.

Method 800 includes receiving 802, from an acquiring party computing device (e.g., acquiring party computing device 104, shown in FIG. 1), a security review request message (e.g., security review request message 106, also shown in FIG. 1) requesting a data security review for a target system (e.g., target system 101, also shown in FIG. 1). The security review request message includes an identifier of the target system (e.g., identifier 110, shown in FIG. 1).

Method 800 also includes querying 804, using the identifier of the target system, a first data source of a plurality of data sources (e.g., data source 112, shown in FIG. 1), to receive data representing whether the target system has been a subject of a past data breach. Method 800 includes locally caching 806, in the memory device (e.g., cache 114, shown in FIG. 1), the data representing whether the target system has been a subject of a past data breach.

Method 800 further includes querying 808, using the identifier of the target system, a second data source of the plurality of data sources, to receive data associated with a potential for a future data breach at the target system, and locally caching 810, in the memory device, the data associated with the potential for a future data breach at the target system.

Method 800 still further includes generating 812 a data security score (e.g., data security score 610, shown in FIG. 6) by analyzing the locally cached data. The data security score represents a likelihood that the target system has been the subject of a data breach and is vulnerable to a future data breach. In some embodiments, generating 812 includes generating a first sub-score (e.g., a sub-score 608, shown in FIG. 6) by analyzing the locally cached data representing whether the target system has been a subject of a past data breach, generating a second sub-score by analyzing the locally cached data associated with the potential for a future data breach at the target system, and generating the data security score by aggregating the first and second sub-scores.

Method 800 also includes compiling 814 the data security score and one or more additional data elements (e.g., additional data elements 612) into a data security report (e.g., data security report 614, both shown in FIG. 6), the one or more additional elements including a recommendation to reduce vulnerability to a future data breach at the target system. Method 800 further includes transmitting 816, to the acquiring party computing device, a security review response message (e.g., security review response message 618, shown in FIG. 6) including the data security report.

Method 800 optionally includes retrieving, from the memory device, scoring parameters defining how to weight the locally cached data and an output format for the data security report, generating 812 the data security score based on the scoring parameters, and formatting the data security report according to the scoring parameters.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A data security evaluation computing device for evaluating data security of a target system, the data security evaluation computing device communicatively coupled to a plurality of data sources including the target system, the data security evaluation computing device comprising a processor in communication with a memory device, the processor programmed to:
receive, from an acquiring party computing device, a security review request message requesting a data security review for the target system, the security review request message including a first identifier of the target system;
in response to the security review request message, automatically retrieve and store at least one alternative identifier of the target system, wherein the at least one alternative identifier differs in at least one of a format or a type from the first identifier;
query, using the first identifier of the target system, a first data source of the plurality of data sources, wherein the first data source includes a fraud report database storing inactive fraud reports and active fraud reports, each inactive fraud report associated with a reported and investigated fraud incident, each active fraud report associated with a reported fraud incident undergoing investigation;
receive, from the fraud report database in response to the querying, any inactive fraud reports for the target system and any active fraud reports for the target system;
locally cache, in the memory device, data representing whether the target system has been a subject of a past data breach, the data comprising:
when one or more inactive fraud reports or one or more active fraud reports are received, the one or more inactive or active fraud reports; and
when no inactive or active fraud reports are received, a data element indicating no fraud reports were received;
query, using the at least one alternative identifier of the target system, at least one second data source of the plurality of data sources, to receive data associated with a potential for a future data breach at the target system;
locally cache, in the memory device, the data associated with the potential for a future data breach at the target system;
generate a data security score by analyzing the locally cached data, the data security score representing a likelihood that the target system has been the subject of a data breach and is vulnerable to a future data breach;
compile the data security score and one or more additional data elements into a data security report, the one or more additional data elements including a recommendation to reduce vulnerability to a future data breach at the target system; and
transmit, to the acquiring party computing device, a security review response message including the data security report.

2. The data security evaluation computing device of claim 1, wherein the processor is further programmed to determine whether one or more of the inactive and active fraud reports are associated with a common point of purchase (CPP) breach event for which the acquired party was a source.

3. The data security evaluation computing device of claim 1, wherein the processor is further programmed to:
automatically initiate an additional review process based on the first identifier or the at least one alternative identifier of the target system;
generate a list of payment account numbers (PANs) associated with payment transactions initiated at the target system over a period of time; and
compare the list of PANs with the one or more inactive or active fraud reports;
compare the list of PANs to a list of fraud declines associated with incomplete payment transactions declined for suspected fraud; and
determine, based on the comparisons, a likelihood that the target system is a source of an unreported common point of purchase (CPP) breach event.

4. The data security evaluation computing device of claim 1, wherein the processor is further programmed to:
generate a reported fraud sub-score based on the locally cached inactive or active fraud reports; and
generate the data security score based in part on the reported fraud sub-score.

5. The data security evaluation computing device of claim 1, wherein the at least one second data source includes web resources of the target system, wherein the web resources include a plurality of web pages associated with the target system, wherein querying the web resources comprises:
transmitting a respective test signal to the plurality of web pages, each test signal including a query associated with a security feature of a corresponding web page of the plurality of web pages, each query initiating a response from the corresponding web page;
receiving a plurality of responses, each received response including a respective status of the security feature on the corresponding web page; and
locally caching the received responses as external review analytics.

6. The data security evaluation computing device of claim 5, wherein the processor is further programmed to:
generate an external review sub-score based on the locally cached external review analytics; and
generate the data security score based in part on the external review sub-score.

7. The data security evaluation computing device of claim 1, wherein the first data source or the at least one second data source further includes an illicit threat data source of text-based content associated with illicit threats associated with the target system, and wherein querying the illicit threat data source comprises:
crawling the illicit threat data source for text-based content including the first identifier or the at least one alternative identifier of the target system, the text-based content indicating a breach of the target system has likely been conducted; and
locally caching the text-based content as an illicit threat assessment.

8. The data security evaluation computing device of claim 7, wherein querying the illicit threat data source further comprises:
generating a list of payment account numbers (PANs) associated with payment transactions initiated at the target system over a period of time; and
crawling the illicit threat data source for text-based content including any PAN from the list.

9. The data security evaluation computing device of claim 7, wherein the processor is further programmed to:
generate an illicit threat sub-score based on the locally cached illicit threat assessment; and
generate the data security score based in part on the illicit threat sub-score.

10. The data security evaluation computing device of claim 1, wherein the at least one second data source includes a compliance review database storing compliance assessments descriptive of the target system's compliance with data security standards, and wherein the processor is further programmed to:
receive, from the compliance review database, any compliance assessments associated with the target system; and
locally cache the compliance assessments.

11. The data security evaluation computing device of claim 10, wherein the processor is further programmed to:
generate a compliance sub-score based on the locally cached compliance assessments; and
generate the data security score based in part on the compliance sub-score.

12. The data security evaluation computing device of claim 10, wherein the processor is further programmed to:
transmit a verification signal to the target system including a request for a verification data element;
receive, from the target system, a response including the verification data element having an associated value; and
compare the verification data element to a reported data element of a first compliance assessment to verify the reported data element.

13. The data security evaluation computing device of claim 1, wherein the at least one second data source includes the target system.

14. A computer-implemented method for evaluating data security of a target system, the method implemented using a data security evaluation computing device communicatively coupled to a plurality of data sources including the target system, the data security evaluation computing device including a processor in communication with a memory device, the method comprising:
receiving, from an acquiring party computing device, a security review request message requesting a data security review for a target system, the security review request message including a first identifier of the target system;
in response to the security review request message, automatically retrieving and storing at least one alternative identifier of the target system, wherein the at least one alternative identifier differs in at least one of a format or a type from the first identifier;
querying, using the first identifier of the target system, a first data source of the plurality of data sources, to receive data representing whether the target system has been a subject of a past data breach;
locally caching, in the memory device, the data representing whether the target system has been a subject of a past data breach;
querying, using the at least one alternative identifier of the target system, at least one second data source of the plurality of data sources, to receive data associated with a potential for a future data breach at the target system, wherein the at least one second data source includes web resources of the target system, wherein the web resources include a plurality of web pages associated with the target system, said querying comprising:
transmitting a respective test signal to the plurality of web pages, each test signal including a query associated with a security feature of a corresponding web page of the plurality of web pages, each query initiating a response from the corresponding web page; and
receiving a plurality of responses, each received response including a respective status of the security feature on the corresponding web page;
locally caching, in the memory device, the received responses as external review analytics associated with the potential for a future data breach at the target system;
generating a data security score by analyzing the locally cached data, the data security score representing a likelihood that the target system has been the subject of a data breach and is vulnerable to a future data breach;
compiling the data security score and one or more additional data elements into a data security report, the one or more additional data elements including a recommendation to reduce vulnerability to a future data breach at the target system; and
transmitting, to the acquiring party computing device, a security review response message including the data security report.

15. The method of claim 14, further comprising:
retrieving, from the memory device, scoring parameters defining how to weight the locally cached data and an output format for the data security report;
generating the data security score based on the scoring parameters; and
formatting the data security report according to the scoring parameters.

16. The method of claim 14, wherein generating the data security score comprises:
generating a first sub-score by analyzing the locally cached data representing whether the target system has been a subject of a past data breach;
generating a second sub-score by analyzing the locally cached data external analytics associated with the potential for a future data breach at the target system; and
generating the data security score by aggregating the first and second sub-scores.

17. At least one non-transitory computer-readable storage medium having computer-executable instructions embodied thereon wherein, when executed by at least one processor of a data security evaluation computing device communicatively coupled to a plurality of data sources including a target system, the computer-executable instructions cause the at least one processor to:
receive, from an acquiring party computing device, a security review request message requesting a data security review for the target system, the security review request message including a first identifier of the target system;
in response to the security review request message, automatically retrieve and store at least one alternative identifier of the target system, wherein the at least one alternative identifier differs in at least one of a format or a type from the first identifier;
query, using the first identifier of the target system, a first data source of the plurality of data sources, to receive data representing whether the target system has been a subject of a past data breach;
locally cache, in a memory device, the data representing whether the target system has been a subject of a past data breach;
query, using the at least one alternative identifier of the target system, at least one second data source of the plurality of data sources, to receive data associated with a potential for a future data breach at the target system, wherein the first data source or the at least one second data source includes an illicit threat data source of text-based content associated with illicit threats associated with the target system, and
wherein either the querying of the first data source or the querying of the at least one second data source comprises crawling the illicit threat data source for text-based content including the first identifier or the at least one alternative identifier of the target system, the text-based content indicating a breach of the target system has likely been conducted;
locally cache, in the memory device, the data associated with the potential for a future data breach at the target system, including caching the text-based content as an illicit threat assessment;
generate a data security score by analyzing the locally cached data, the data security score representing a likelihood that the target system has been the subject of a data breach and is vulnerable to a future data breach;
compile the data security score and one or more additional data elements into a data security report, the one or more additional data elements including a recommendation to reduce vulnerability to a future data breach at the target system; and
transmit, to the acquiring party computing device, a security review response message including the data security report.

18. The at least one non-transitory computer-readable storage medium of claim 17, wherein the computer-executable instructions further cause the at least one processor to:
retrieve, from the memory device, scoring parameters defining how to weight the locally cached data and an output format for the data security report;
generate the data security score based on the scoring parameters; and
format the data security report according to the scoring parameters.

19. The at least one non-transitory computer-readable storage medium of claim 17, wherein the computer-executable instructions further cause the at least one processor to generate the data security score by:
generating a first sub-score by analyzing the locally cached data representing whether the target system has been a subject of a past data breach;
generating a second sub-score by analyzing the locally cached data associated with the potential for a future data breach at the target system; and
generating the data security score by aggregating the first and second sub-scores.

* * * * *